Jan. 7, 1947.　　A. O. SORENSEN　　2,413,894
UNIVERSAL MIRROR FOR MOTOR VEHICLES
Filed April 5, 1944
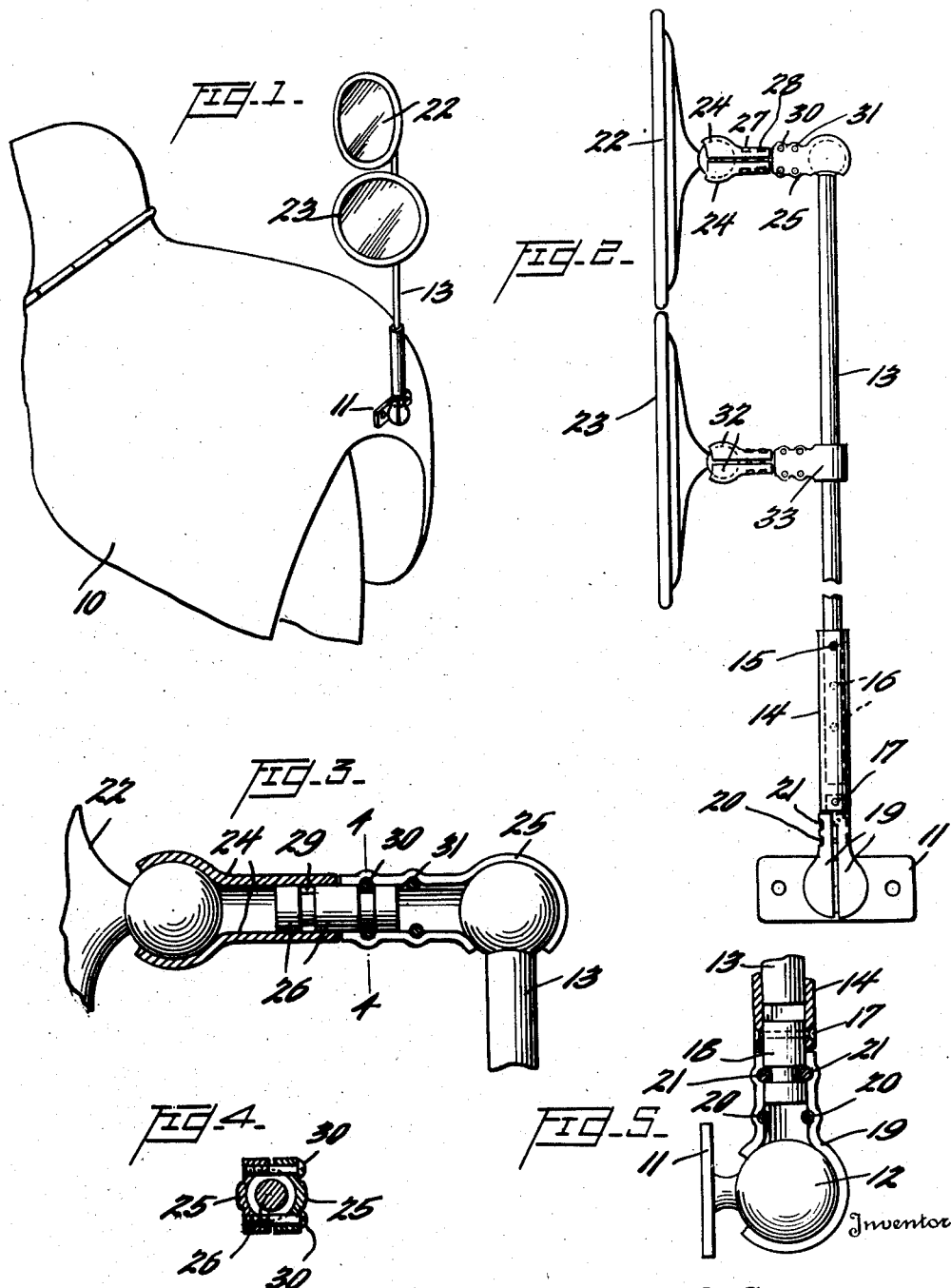
Inventor
Alfred O. Sorensen,
By F. W. Dahn
Attorney Patented Jan. 7, 1947

2,413,894

UNITED STATES PATENT OFFICE 2,413,894

UNIVERSAL MIRROR FOR MOTOR VEHICLES

Alfred Octavius Sorensen, Bakersfield, Calif.

Application April 5, 1944, Serial No. 529,665

5 Claims. (Cl. 88—86)

My invention relates to mirror constructions for motor vehicles and it is an object of the same to provide means that shall do away with much of the damage and annoyance incident to the close parking necessitated by the great increase in the number of motor vehicles in use at the present time. It is a matter of common experience that difficulty is encountered in parking a car between and parallel to two others that are rather close together, and even more so in backing a car out of such position. Damage is frequently done to running boards, fenders and bumpers. Still more important, in places such as shopping centers children run and play between parked cars and are liable to be injured seriously, particularly should they be trapped between the operated car and the next one to the right, where the operator has little or no chance of seeing them. By the use of my invention even on the operated car alone these dangers are greatly mitigated, since the operator can see the space at the right of his car without moving and can look back to his left without difficulty. Should the car to the left of the operator also be equipped with the device of my invention he can see both sides of his own car and their relation to the adjacent cars without even moving his head provided the devices are properly adjusted.

While the use of the device in movement into and out of narrow parking spaces is considered the most important function of the device it will be obvious that the same will also be helpful in driving through narrow alleys and the like, in passing parked or moving cars on the road, and in other cases where there would otherwise be danger of collision, etc.

Another object of my invention is to provide such adjustments as will enable the user to set the one mirror so as to give him the most complete and convenient opportunities to observe vehicles and the like at his right, while at the same time providing means to provide the operator of a car at his right with facilities to observe conveniently and accurately the relative positions of the two cars and of objects between them.

Referring to the drawing, which is made a part of this application and in which similar characters of reference indicate similar parts:

Fig. 1 is a perspective of the front right side portion of a motor vehicle having my device mounted thereon, Fig. 2, a side elevation of the device of my invention, Fig. 3, an enlarged detail of a joint forming part of my invention, partly in section, Fig. 4, a section on line 4—4 of Fig. 3, and Fig. 5, a detail of the lower part of Fig. 2, partly in section.

In the drawing, reference character 10 indicates the fender of a motor vehicle, to which is attached a bracket 11 by means of bolts, rivets or the like, said bracket having as an integral part thereof a ball 12. A rod 13 is connected to the bracket by means comprising a sleeve 14 in which the rod is slidable for adjusting the height of the mirrors, the rod being held in position in the sleeve by means of a setscrew 15 adapted to engage in any one of a plurality of holes in the rod, as indicated at 16.

At its lower end the sleeve is provided with a setscrew 17 for engagement with the upper end of a short rod 18, which short rod is secured to the ball 12 by means of a split sleeve including two halves 19, 19 fastened to each other by bolts 20, 20 and by another pair of bolts 21, 21 that have a double function of connecting the said halves and of engagement in an annular groove in the rod 18 to fix said rod and the sleeve against relative endwise movement.

The rod 13 carries two spaced mirrors 22 and 23, shown for convenience in Fig. 2 as lying in the same plane, but intended to be set when in use substantially as indicated in Fig. 1, wherein the upper mirror is set for use by the occupant of the car to give him a side view of the car to the right of him, or of course of other objects at his right. The lower mirror is set so that the driver of a car at the right of the one partly shown can have a side view of the latter and especially can see how they are spaced throughout their length and whether there is anything between them, all without turning his head.

For my purposes the upper mirror is mounted on a bracket consisting of two sets of half-sleeves 24, 24 and 25, 25. The set 24, 24 forms a split sleeve that is clamped at opposite ends respectively about a ball on mirror frame 22 and about a short rod 26 by means of bolts 27, 28 (Fig. 2) similar to those in Fig. 5 in that bolt 27 merely clamps the halves together while bolt 28 also has the function of engaging in a groove at 29 to prevent relative endwise movement between the rod and the split sleeve. The split sleeve 25, 25 likewise connects the ball-shaped upper end of rod 13 to the short rod 26 by means of bolts 31 clamping the sleeves to the parts engaged thereby and bolts 30, 30 that further engage in a groove in the rod 26, as previously described. It may be noted that the split between the halves 24, 24 is at right angles to that between halves 25, 25.

The mounting of the lower mirror 23 is substantially similar to that of the upper mirror 22, the frame having a ball member to be gripped by a split sleeve 32, 32 and the rod being arranged to be gripped by the halves of a split sleeve 33 which differs from the sleeve above it in that it is shaped to grip a cylindrical rod member. Both sets of split sleeves grip an intermediate short rod-like member as in the case of the bracket for the upper mirror, and so are not described in detail.

It will be evident that the arrangement shown permits a wide range of adjustments, all as may be necessitated in its use on cars of different shapes and sizes, etc. Thus, the pivotal support at the bottom permits the device to be swung in or out and forward and back, as well as intermediate directions. The pivotal adjustment of the mirrors on the upright permits further adjustments toward or away from the vehicle body combined with changes in plane of each mirror, while the ball-and-socket mounting of each individual mirror permits a wide range of adjustment of the plane of each mirror.

If all cars were equipped with the device so far described nothing more would be necessary so far as concerns satisfactory side views of other cars in relation to that of a driver. During the interim before such condition prevails, or before some equivalent means is provided, the user of a car may, if he desires to obtain the fullest benefits of my invention, mount on his lefthand fender a slightly modified device that will give him a side view of a car at his left side and its relation to his own. This consists merely in omitting the lower mirror 23 and its supporting bracket. When such a modified member is mounted on the left fender it will obviously be feasible for the driver to get a side view such as above referred to without turning his head.

It will be obvious to those skilled in the art that various changes may be made in the device shown and described, all without departing from the spirit of my invention; therefore I do not limit myself to what is so shown and described but only as indicated by the appended claims.

I claim:

1. The combination of a motor vehicle having fenders, a bracket on the front fender remote from the driver's seat, a ball-and-socket joint on the bracket, an upright extensible rod supported by said joint for universal adjustment, a pair of mirrors on said rod, the one mirror being set so as to enable the driver to view the side of a vehicle at his right, and the other being set so as to enable the driver of a vehicle at the right of the one first named to view the adjacent side of the first-named vehicle.

2. A device as in claim 1, including means whereby said upright rod may be rotated on its support independently of its ball-and-socket joint.

3. A device as in claim 1, including a laterally extending bracket for each mirror, each bracket being mounted on the rod by means providing for rotary adjustment in a horizontal plane about said rod, and a ball-and-socket joint between each mirror and its bracket for further adjustment.

4. A device as in claim 1, including a ball-and-socket joint between said rod and its bracket for adjustment in the positions of the mirrors.

5. A device as in claim 1, including a laterally extending bracket for each mirror, each of said brackets being mounted on the rod by means providing a rotary adjustment in a horizontal plane about said rod, and a ball-and-socket joint between each mirror and its bracket for further adjustment, the connections between said means and said joint comprising hollow sleeves each journaled for rotation about a rod common to both sleeves so as to permit the corresponding mirror to be rotated about the axis of said rod.

ALFRED OCTAVIUS SORENSEN.